(12) United States Patent
Lee et al.

(10) Patent No.: US 7,983,494 B2
(45) Date of Patent: Jul. 19, 2011

(54) METHOD, MEDIUM, AND SYSTEM COMPRESSING AND/OR DECOMPRESSING PIXEL DATA

(75) Inventors: Shi Hwa Lee, Seoul (KR); Hye Yun Kim, Gyeonggi-do (KR); Sang Jo Lee, Gyeonggi-do (KR); Do-Hyung Kim, Gyeonggi-do (KR); Doo Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1177 days.

(21) Appl. No.: 11/711,637

(22) Filed: Feb. 28, 2007

(65) Prior Publication Data

US 2007/0206874 A1 Sep. 6, 2007

(30) Foreign Application Priority Data

Mar. 2, 2006 (KR) .................. 10-2006-0020090

(51) Int. Cl.
*G06K 9/46* (2006.01)
(52) U.S. Cl. ................ 382/232; 382/166; 358/426.02; 358/426.04; 358/426.06
(58) Field of Classification Search ........... 382/166, 382/232, 239; 358/426.02, 426.04, 426.06
See application file for complete search history.

(56) References Cited

U.S. PATENT DOCUMENTS

| | | | |
|---|---|---|---|
| 6,427,025 B1 * | 7/2002 | Shimomura et al. ........ 382/232 |
| 2002/0126755 A1 * | 9/2002 | Li et al. .................. 375/240.12 |
| 2003/0206592 A1 * | 11/2003 | Srinivasan et al. ....... 375/240.16 |
| 2004/0227963 A1 | 11/2004 | Jacobsen et al. |

FOREIGN PATENT DOCUMENTS

| | | |
|---|---|---|
| JP | 2005-136781 | 5/2005 |
| KR | 10-2000-0033017 | 6/2000 |
| KR | 10-2002-0013009 | 2/2002 |
| KR | 10-2004-0007687 | 1/2004 |
| KR | 10-2005-0029386 | 3/2005 |
| KR | 10-2005-0077454 | 8/2005 |

* cited by examiner

*Primary Examiner* — Vikkram Bali
*Assistant Examiner* — Eueng-Nan Yeh
(74) *Attorney, Agent, or Firm* — Staas & Halsey LLP (57) ABSTRACT

A pixel data compression/decompression system, medium, and method, including determining the similarity between a first pixel data and a second pixel data adjacent to the first pixel data, selecting one of a first compression mode, where a difference between a compression ratio of the first pixel data and a compression ratio of the second pixel data is high, and a second compression mode, where a difference between a compression ratio of the first pixel data and a compression ratio of the second pixel data is low, based on the similarity, and compressing the first pixel data and the second pixel data based on the selected compression mode.

37 Claims, 8 Drawing Sheets

METHOD, MEDIUM, AND SYSTEM COMPRESSING AND/OR DECOMPRESSING PIXEL DATA

CROSS-REFERENCE TO RELATED APPLICATIONS

This application claims priority from Korean Patent Application No. 10-2006-0020090, filed on Mar. 2, 2006, in the Korean Intellectual Property Office, the disclosure of which is incorporated herein by reference.

BACKGROUND OF THE INVENTION

1. Field of the Invention

One or more embodiments of the present invention relate to image data compression, and more particularly, to a pixel data compression and/or decompression method, medium, and system reducing an amount of data stored in a memory, such as a display driver.

2. Description of the Related Art

Display devices are typically arranged to display many pixels, with the pixel potentially being the minimum unit of a corresponding digital image forwarded to the display. Such display devices may include monitors or TVs and directly correspond the forwarded digital image pixel data to particular pixels on the screen. For example, when a monitor has a resolution of 640*480, the monitor may display the display image on the screen by illuminating 640 pixels in the horizontal direction and 480 pixels in the vertical direction.

Generally, data for each pixel includes R, G, and B component data. For example, pixel data of R, G, and B data for a pixel may be represented by a total of 18 bits, each of the R, G, and B data having 6 bits.

On the other hand, in such displays a display driver is used to drive the selective illumination of the particular display pixels, e.g., based a signal generated by a computer. The display driver may include a memory for the respective storing of pixel data that will be displayed on the display. Here, generally, the size of the memory is also limited, so the amount of pixel data that can be stored is similarly limited.

Accordingly, it has been found that if the size of pixel data stored in a display driver is truncated, the size of a memory included in the display driver may be reduced, resulting in reduced manufacturing costs of the display.

However, when such pixel data is truncated, or compressed, it is difficult to avoid deterioration of the resultant-displayed image caused by the data loss. This loss of data by truncation or compression in effect results in distortion or noise showing up in the displayed image.

Accordingly, an improved pixel data compression method, medium, and system capable of efficiently reducing the size of pixel data and minimizing data loss to avoid displayed image deterioration has been found desirable by the inventors.

SUMMARY OF THE INVENTION

An aspect of one or more embodiments of the present invention provides a pixel data compression method, medium, and system, in which similarity between two adjacent pixels is efficiently calculated and a suitable compression mode is selected according to the calculated similarity, thereby minimizing deterioration of definition while compressing pixel data.

An aspect of one or more embodiments of the present invention further provides a pixel data compression method, medium, and system capable of reducing complexity, and efficiently compressing pixel data.

An aspect of one or more embodiments of the present invention still further provides a pixel data compression method, medium, and system capable of efficiently identifying a desired part of a total screen of a display device to compress/decompress according to an appropriate efficient compression algorithm.

Additional aspects and/or advantages of the invention will be set forth in part in the description which follows and, in part, will be apparent from the description, or may be learned by practice of the invention.

To achieve the above and/or other aspects and advantages, embodiments of the present invention include a pixel data compression method, including identifying whether a similarity exists between a first pixel data and a second pixel data, with a pixel represented by the second pixel data being adjacent to a pixel represented by the first pixel data, selecting a compression mode from one of a first compression mode and a second compression mode based upon whether the similarity is determined to exist, with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference, and compressing the first pixel data and the second pixel data using the selected compression mode.

To achieve the above and/or other aspects and advantages, embodiments of the present invention include a pixel data decompression method, including determining which one of a first compression mode and a second compression mode a compressed first and second pixel data is compressed by, based on a mode bit coexistent with the compressed first and second pixel data, decoding the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode, and decoding the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

To achieve the above and/or other aspects and advantages, embodiments of the present invention include at least one medium including computer readable code to control at least one processing element to implement embodiments of the present invention.

To achieve the above and/or other aspects and advantages, embodiments of the present invention include a method for compressing video data, including selectively, within a video image bitstream, compressing separate components of a first pixel of the video data and separate components of a sequential second pixel of the video data according one of a first compression mode and a second compression mode, wherein both the first compression mode and the second compression mode compress separate components of pixels to generate compressed pixel data with same bit lengths.

To achieve the above and/or other aspects and advantages, embodiments of the present invention include a method for decompressing video data, including determining which one of a first compression mode and a second compression mode a compressed first and second pixel data is compressed by, based on a mode bit coexistent with the compressed first and second pixel data, selectively, within a corresponding video image bitstream, decompressing separate components of a first pixel of the video data, corresponding to the first pixel data, and separate components of a sequential second pixel of the video data, corresponding to the second pixel data, according the one of the first compression mode and a second compression mode, wherein both the first compression mode and the second compression mode compress separate components of pixels to generate compressed pixel data with same bit lengths.

To achieve the above and/or other aspects and advantages, embodiments of the present invention include a pixel data compression system, including a similarity determination unit to identify whether a similarity exists between a first pixel data and a second pixel data, with a pixel represented by the second pixel data being adjacent to a pixel represented by the first pixel data, a mode selection unit to select a compression mode from one of a first compression mode and a second compression mode based upon whether the similarity is determined to exist, with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference, and a data compression unit to compress the first pixel data and the second pixel data using the selected compression mode.

To achieve the above and/or other aspects and advantages, embodiments of the present invention include a pixel data decompression system, including a mode identification unit to identify which one of a first compression mode and a second compression mode a compressed first and second pixel data is compressed by, based on a mode bit coexistent with the compressed first and second pixel data, and a data decoding unit to decode the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode, and to decode the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
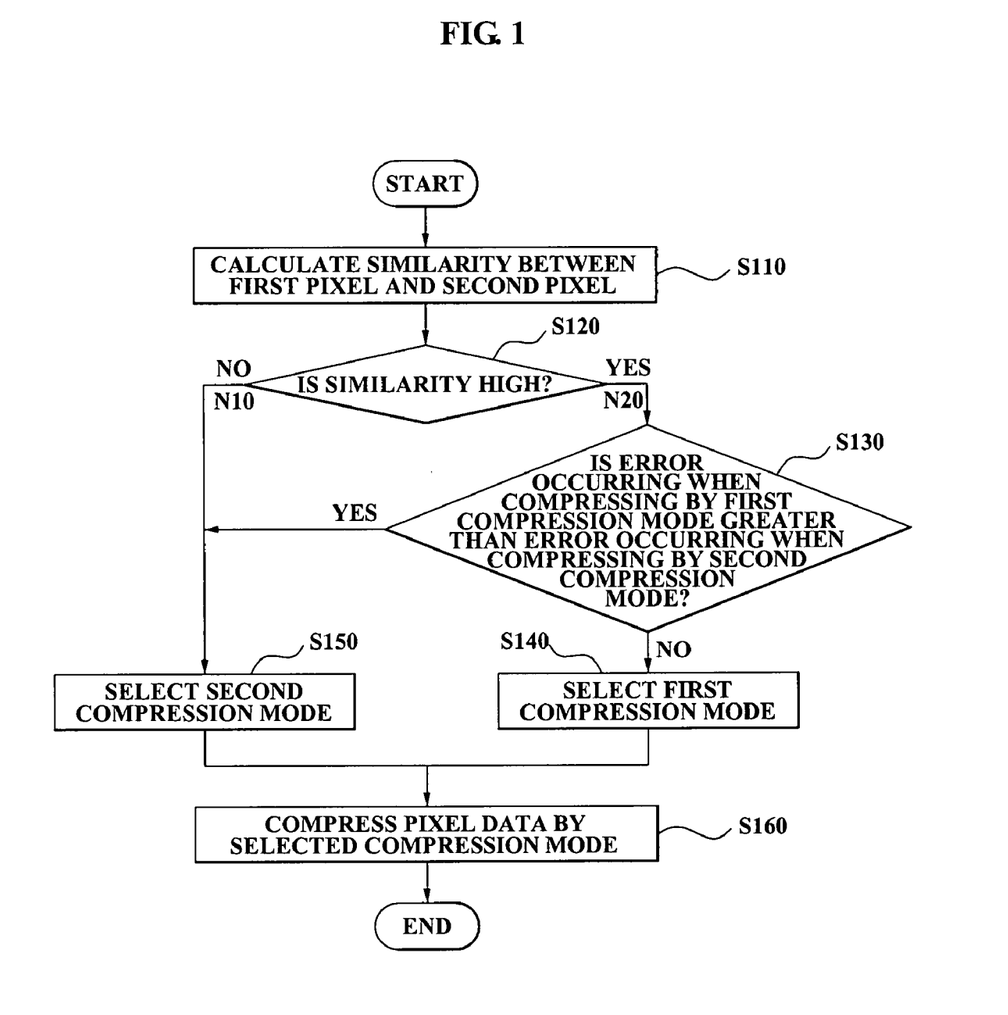
FIG. 1 illustrates a pixel data compression method, according to an embodiment of the present invention.

FIG. 1 illustrates a pixel data compression method, according to an embodiment of the present invention.

Referring to FIG. 1, a similarity between a first pixel data and a second pixel data may be calculated, in operation S110.

In this case, the first pixel data can be adjacent to the second pixel data. For example, each of the first pixel data and the second pixel data may be physically next to each other and represented by 18 bit data, including respective R, G, and B data of 6 bits each.

Here, in one embodiment, the similarity between the first pixel data and the second pixel data may be separately calculated for each of the R, G, and B.

It may further be determined whether the similarity between the first pixel data and the second pixel data is high, in operation S120, which will be explained in greater detail below.

As shown in FIG. 1, to reduce compression errors, when the similarity between the first pixel data and the second pixel data is determined to be high, it may further be determined whether a compression error occurring when compressing by a first compression mode is or would be greater than a compression error occurring when compressing by a second compression mode, e.g., by calculating such errors occurring when compressing by the first compression mode and the second compression mode, in operation S130.

Here, when a compression error occurring when compressing by the first compression mode is determined to be greater than the compression error when compressing by the second compression mode, the second compression mode of operation S150 may be instituted In this case, the second compression mode may thus have a relatively lower level of compression between the first pixel data and the second pixel data compared to the first compression mode. For example, when the first pixel data and the second pixel data are similar, a higher level of compression can be instituted with the first compression mode since a correlation between the adjacent pixels can be inferred, while when the first pixel data and the second pixel data are not similar or the above mentioned compression errors are unacceptable the lower level of compression may be instituted As the result of the above mentioned determination of operation S120, when the similarity between the first pixel data and the second pixel data is determined to be small, the second compression mode of operation S150 may similarly be instituted As the result of the above mentioned determination of operation S130, when the compression error occurring when compressing by the first compression mode is determined to be less than the compression error occurring when compressing by the second compression mode, the first compression mode of operation S140 may be implemented.

Similar to above, with the first compression mode, the level or degree of compression may be greater (compared to the second compression mode) between the first pixel data and the second pixel data.

In addition, in an embodiment, when any of the compression modes are selected, e.g., from between the first compression mode and the second compression mode, compression of the pixel data may then be instituted in operation S160 for the selected compression mode.

As noted above, depending on embodiments, after compressing the first pixel data and the second pixel data, the compressed first and second pixel data may be stored in a memory of a display driver, noting that embodiments of the present invention do not limit the placement of a system or included apparatuses that actually performs the compression or ultimately decompresses the same. For example, decompressing may be accomplished by the display driver after review of the memory of the display driver.

In one embodiment, when the similarity between the first pixel data and the second pixel data is determined to be high, e.g., representing that the second pixel data may be easily calculated from the first pixel data, pixel data is compressed by a method similar to a differential pulse code modulation (DPCM). Similarly, according to an embodiment, when the similarity between the first pixel data and the second pixel data is determined to be low, e.g., representing that it is difficult and inefficient to calculate the second pixel data from the first pixel data, the first pixel data and the second pixel data may be separately compressed.

As only example, when pixel data is formed of 18 bits including R, G, and B data, each respectively with 6 bits, the first compression mode may be a mode where the first pixel data is compressed to have 3 bits for each of the R, G, and B data and the second pixel data is compressed to have 3 bits for the R and G data, for example, and 2 bits for the B data. In this case, with respect to the R and G data of the second pixel data, respective three low-order bits may result, and with respect to the B data, two bits of the three low-order bits excluding the lowest bit may result.

Thus, as an example, when the R or G data of the first pixel data is the binary 110001, and the R or G data of the second pixel data is the binary 110000, in the first compression mode, the R and G data of the first pixel data may be passed through as is as 110001, and the R and G data of the second pixel data may be compressed to 000 by selecting three low-order bits of the second pixel data. Further, when the B data of the first pixel data is the binary 110000, and the B data of the second pixel data is the binary 110001, in the second compression mode, the B data of the first pixel data may be passed through as is as 110000, and the B data of the second pixel data may be compressed to 00 by removing a lowest bit from three low-order bits of the second pixel data.

Again, in one embodiment, when pixel data is formed of 18 bits including R, G, and B data with 6 bits each, the second compression mode may be a mode where both the first and second pixel data is compressed to have 4 bits for each of the respective R and B data and both the first and second pixel data is compressed to have 5 bits for the respective G data. Further, according to an embodiment, in such a second compression mode, according to an embodiment, four high-order bits, five high-order bits, and four high-order bits, from 6 bits of the R data, 6 bits of the G data, and 6 bits of the B data of the first pixel and the second pixel, respectively, may result.

Thus, as an example, when the R and B data of the first pixel data is the respective binary 110001, and the R or B data of the second pixel data is the respective binary 101101, in the second compression mode, the R and B data of the first pixel data may be respectively compressed to 1100 by selecting four high-order bits of the respective first pixel data 110001, and the R and B data of the second pixel data may similarly be respectively compressed to 1011 by selecting four high-order bits of the respective second pixel data 101101. Further, when the G data of the first pixel data is the binary 110001, and the G data of the second pixel data is the binary 101101, in the second compression mode, the G data of the first pixel data may be compressed to 11000 by selecting five high-order bits of the first pixel data 110001 and the G data of the second pixel data may be compressed to 10110 by selecting five high-order bits of the second pixel data 101101.

In addition, in an embodiment, in encoding such compressed binary data, one bit for a mode bit may be included for identifying whether pixel data is encoded by the first compression mode or the second compression mode.

Figure 2:
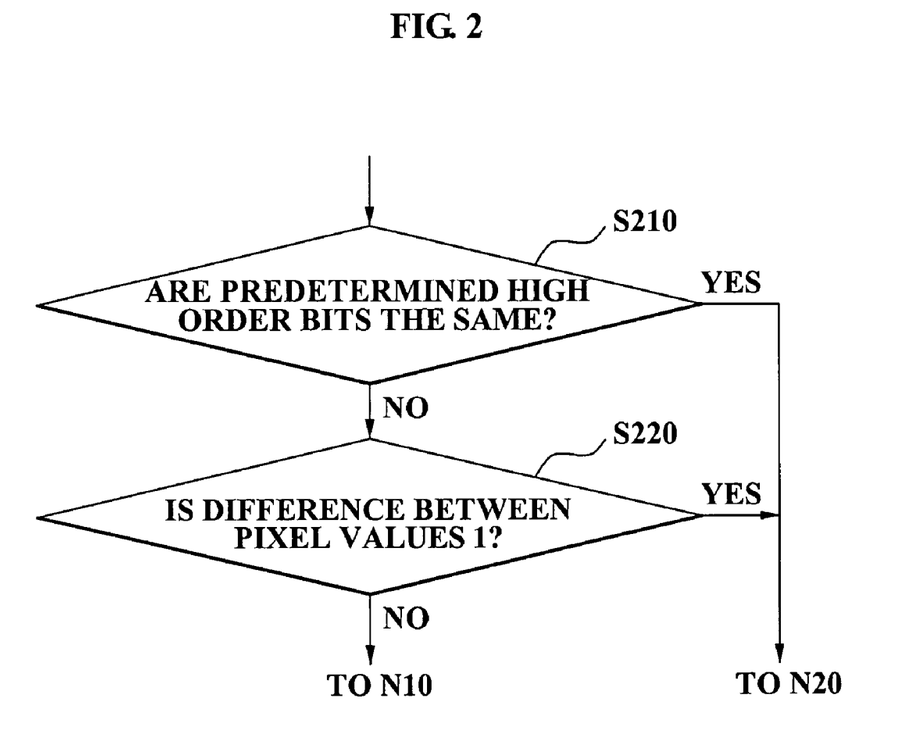
FIG. 2 illustrates an operation of similarity determination, for such a corresponding method as shown in FIG. 1, according to an embodiment of the present invention.

FIG. 2 illustrates an operation of a similarity determination, for such a corresponding operation S120 shown in FIG. 1, according to an embodiment of the present invention. For this illustrated embodiment, FIG. 1 illustrates similar N10 and N20 references as shown in FIG. 2, to graphically illustrate the relationship between FIG. 2 and FIG. 1.

Referring to FIG. 2, whether predetermined high-order bits of the R, G, and B of each of the first pixel data and second pixel data are identical with each other may be determined, in operation S210.

In this case, the similarity between the first pixel data and the second pixel data may be determined for each of the R, G, and B data, for example.

As only an example, when the R data of the first pixel data represents the decimal value 31, and the R data of the second pixel data is represents the decimal value 30, the R data of the first pixel data would be represented by the binary 011111, and the R data of the second pixel data would be represented by the binary 011110. In this case, since the three high-order bits 011 of the R data of the first pixel data is identical with the three high-order bits 011 of the R data of the second pixel data, the similarity between the values of the R data of the first pixel data and second pixel data may be determined to be high.

In addition, as a result of this identical similarly determination, when the predetermined high-order bits of the respective values are not identical with each other, it may be determined whether the respective differences between actual decimal values of each of the R, G, and B data of the first pixel data and the second pixel data is 1, for example, in operation S220.

For example, when the G data of the first pixel data represents the decimal value 31, and the G data of the second pixel data represents the decimal value 32, the G data of the first pixel data would also be represented by the binary 011111, and the G data of the second pixel data would also be represented by the binary 100000. Further, in this case, the decimal value difference between the first pixel data and the second pixel data is actually just 1, three high-order bits of the G data of first pixel data is 011 and three high-order bits of the G data of the second pixel data is 100, which are completely different from each other. Thus, in this example, though the decimal value difference is only 1, the binary representation is substantially different. Regardless, according to an embodiment, since the similarity between the respective R, G, and B data of the first and second pixel data may still be respectively determined to be high since the difference between the first pixel and the second pixel data is actually quite small, e.g., just the decimal value 1. Here, it is noted that this discussed method of determining the similarities between the example two pixels is only one representation of available embodiments. Thus, alternate embodiments are equally available.

Thus, as a result of the determination of operation S220, in this embodiment, when the decimal value difference between the first pixel data and the second pixel data is not 1, the similarity between the first pixel data and the second pixel data may be determined to be low, i.e., dissimilar.

Figure 3:
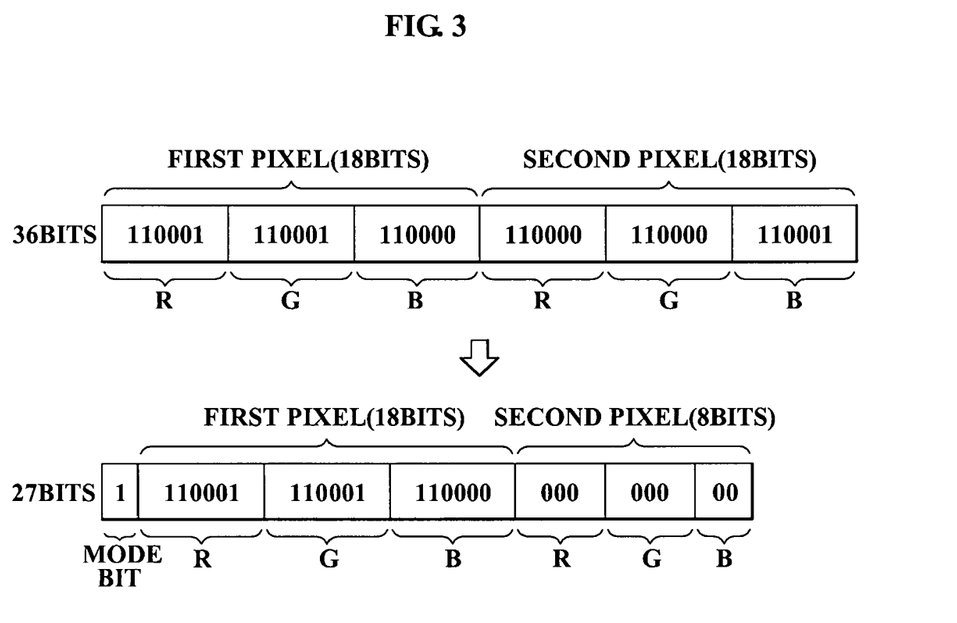
FIG. 3 illustrates a pixel data compression method according to a first compression mode, according to an embodiment of the present invention.

FIG. 3 illustrates a pixel data compression method according to a first compression mode, according to an embodiment of the present invention, again noting that alternative embodiments are equally available.

Referring to FIG. 3, the R, G, and B data of a first pixel data are represented by the binary 110001, 110001, and 110000, respectively, and the R, G, and B data of a second pixel data are represented by the binary 110000, 110000, and 110001. Here, in this example, the first pixel data and the second pixel data before compression total 36 bits of data.

When compressing the two pixel data making up a total of 36 bits, as shown in FIG. 3, the two pixel data may be compressed to the illustrated 27 bit data.

Thus, here, the three high-order bits of the R, G, and B data of the first pixel data are 110, 110, and 110, respectively, and are identical to the three high-order bits 110, 110, and 110 of the R, G, and B data of the second pixel data. Accordingly, the original pixel data shown in FIG. 3 can be compressed by such a first compression mode, thereby having substantial difference between the compression ratio applied to the first pixel data and the compression ratio applied to the second pixel.

In one embodiment, a mode bit may be assigned to a most significant bit (MSB), for example, of the compressed data. More particularly, in this example, when the mode bit is 1, this may indicate that the data is compressed by the first compression mode, and when the mode bit is 0, this may indicate that the data is compressed by the second compression mode.

With respect to the first pixel data, in this example, the R, G, and B data are all encoded by 6 bits without change, i.e., the R, G, and B data can be encoded as 110001, 110001, and 110000, respectively, as they are.

With respect to the R and G data of the second pixel data, in this example, only three low-order bits may be encoded. With respect to the B data of the second pixel data, only two bits of three low-order bits excluding a lowest bit may be encoded. Therefore, the R and G data can be encoded as 000, which represents the three low-order bits of the binary 110000, and the B data can be encoded to be 00, generated by dropping the lowest bit from the three low-order bits 001 of the binary 110001.

Thus, in the case of such a first compression mode, the first pixel data may be encoded to have 18 bits, the second pixel data may be encoded to have 8 bits, and one bit may be added to identify the compression mode, thereby compressing the original 36 bits of the first and second pixel data to 27 bits.

Figure 4:
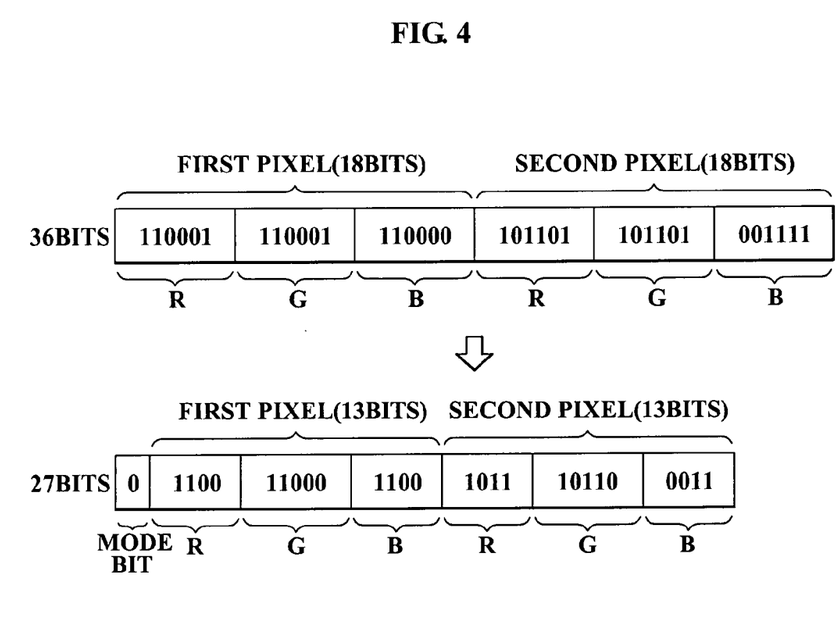
FIG. 4 illustrates a pixel data compression method according to a second compression mode, according to an embodiment of the present invention.

FIG. 4 illustrates a pixel data compression method according to a second compression mode, according to an embodiment of the present invention, again noting that alternative embodiments are equally available.

Referring to FIG. 4, the R, G, and B data of a first pixel data are represented by the binary 110001, 110001, and 110000, respectively, and the R, G, and B data of a second pixel data are represented by the binary 101101, 101101, and 001111, respectively. Again, in this example, the original, i.e., before compression, first and second pixel data total 36 bits of data.

When compressing the two pixel data making up a total of 36 bits, as shown in FIG. 4, the two pixel data may again be compressed, though differently, to 27 bit data, for example.

Thus, here, the three high-order bits of the R, G, and B data of the first pixel data are 110, 110, and 110, respectively, which are different from three high-order bits 101, 101, and 001 of the R, G, and B data of the second pixel data, respectively. Further, in this example, the decimal value difference between the binary 110001 representing the R data of the first pixel data and 101101 representing the R data of the second pixel data is not 1, the decimal value difference between the binary 110001 representing the G data of the first pixel data and 101101 representing the G data of the second pixel data is not 1, and the decimal value difference between the binary 110000 representing the B data of the first pixel data and 001111 representing the B data of the second pixel is not 1. Accordingly, the pixel data shown in FIG. 4 may be compressed by a second compression mode having less of a difference between compression ratios with respect to the first pixel data and the second pixel data.

Similar to above, in an embodiment, a mode bit may further be assigned to an MSB, for example, of the compressed data.

With respect to the respective R and B data of the first pixel data and second pixel data, in this example, two low-order bits may be dropped and only four high-order bits encoded. Namely, the R data of the first pixel data may be encoded to 1100, which represents the four high-order bits of the corresponding binary 110001, and the B data is encoded to 1100, which represents the four high-order bits of the corresponding binary 110000. Further, the R data of the second pixel data may be encoded to 1011, which represents the four high-order bits of the corresponding binary 101101, and the B data may be encoded to 0011, which represents the four high-order bits of the corresponding binary 001111.

For the G data of the first and second pixel data, one low-order bit may be dropped and the remaining five high-order bits encoded. Namely, in this example, the G data of the first pixel data may be encoded to 11000, which represents the five high-order bits of the corresponding binary 110001, and the G data of the second pixel may be encoded to 10110, which represents the five high-order bits of the corresponding binary 101101.

Here, in this example second compression mode, the first pixel data and the second pixel data can both be encoded to have 13 bits, along with the one bit identifying the compression mode bit, for example, thereby compressing the original 36 bits of pixel data to 27 bits of compressed data.

Figure 5:
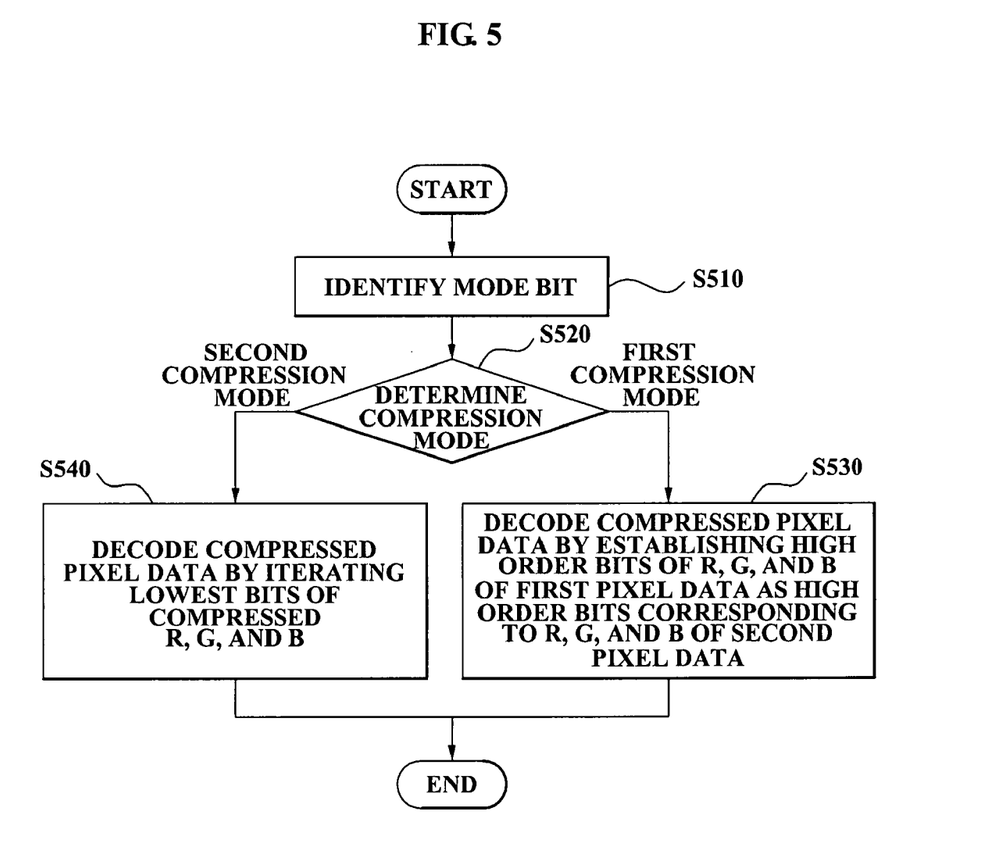
FIG. 5 illustrates operations of a pixel data decompressing method, according to an embodiment of the present invention.

FIG. 5 illustrates a pixel data decoding method, according to an embodiment of the present invention.

Referring to FIG. 5, the mode bit indicating the compression type of the compressed pixel data may be identified, in operation S510.

As described above, in one embodiment, if the mode bit represents a 1 the first compression mode is indicated, and if the mode bit represents a 0 the second compression mode is indicated. Thus, here, whether the pixel data was compressed by the first compression mode or the second compression mode, for example, may be determined by reference such a the mode bit, in operation S520.

When it is determined that the compression mode is the first compression mode, the compressed first pixel data and second pixel data may be decoded by applying the high-order bits of R, G, and B data of the first pixel data for the high-order bits of R, G, and B data of the second pixel data, in operation S530.

As an example, in operation 530, three high-order bits of each of the R, G, and B data of the compressed second pixel data can be restored based on the three high-order bits of each of the R, G, and B data of the first pixel data. The fourth high-order bit and fifth high-order bit of the B data of the compressed first pixel data may further be compared with the two bits of the B data of the second pixel data. When it is determined that the fourth and fifth high-order bits of the B data of the compressed first pixel and two bits of the B data of the second pixel data are identical, the lowest bit of the B data of the second pixel data can be restored for a corresponding lowest bit based on the B data of the first pixel data. When the two bits of the B data of the compressed second pixel data are greater, the lowest bit of the B data of the second pixel data may be restored to 0. When the two bits of the B data of the second pixel data are smaller, the lowest bit of the B data of the compressed second pixel data may be restored to 1.

Thus, in operation S530, when the R, G, and B data of the compressed first pixel data are represented by the binary 110001, 110001, and 110000, respectively, and the R, G, and B data of the compressed second pixel data are 000, 000, and 00, the three highest bits of the R, G, and B data of the compressed second pixel data can be established based on, e.g., the same as, the three highest bits of the R, G, and B data of the compressed first pixel. Further, since the fourth highest bit and the fifth highest bit of the B data of the compressed first pixel data are 00, and the B data of the compressed second pixel data is 00, the lowest bit of the B data of the second pixel data can be restored based on the lowest bit 0 of the B data of the first pixel data. For example, if the R, G, and B data of the first pixel data compressed by the first compression mode are represented by the binary 110001, 110001, and 110000, respectively, and the R, G, and B data of the compressed second pixel data are 000, 000, and 00, respectively, the R, G, and B data of the first pixel data can be decoded to the binary 110001, 110001, and 110000, respectively, and the R, G, and B data of the second pixel data can be restored to the binary 110000, 110000, and 110000, respectively.

For example, when the B data of the first pixel data, compressed by the first compression mode, is the binary 110010 and the B data of the compressed second pixel data is 00, since a fourth highest bit and a fifth highest bit of the B data of the compressed first pixel data are 01 and the B data of the compressed second pixel data is 00, the B data of the compressed second pixel data is smaller. Accordingly, in this case, the lowest bit of the B data of the second pixel data is restored as 1, thereby restoring the B data of the second pixel to the binary 110001.

Further, when the B data of the first pixel data, compressed by the second compression mode, is represented by the binary 110000 and the B data of the compressed second pixel data is represented by the binary 01, since the fourth high-order bit and a fifth high-order bit of the B data of the compressed first pixel data are 00, respectively, and the B data of the compressed second pixel data is 01, the B data of the compressed second pixel data is greater. Thus, in this case, since the lowest bit of the B data of the compressed second pixel data is restored as 0, the B data of the second pixel data can be restored to the binary 110000.

As described above, a difference between a value of the restored first pixel data and the restored second pixel data may be minimized by restoring a final bit of the B data of the second pixel data by comparing the fourth high-order bit and fifth high-order bit of the B data of the first pixel data, compressed by the first compression mode, with the B data of the second pixel data.

When the compression mode is determined to be the second compression mode, for example, the first pixel data and the second pixel data may be decoded by duplicating the lowest bits of the R, G, and B data of the compressed first pixel data and the lowest bits of the R, G, and B data of the compressed second pixel data, in operation S540.

For example, in operation S540, when the R, G, and B data of the compressed first pixel data are represented by 1100, 11000, and 1100, respectively, and the R, G, and B data of the compressed second pixel data are represented by 1011, 10110, and 0011, respectively, the first pixel data and the second pixel data may be restored by duplicating the lowest bit of each of the R, G, and B data of the compressed first pixel data and the lowest bit of each of the R, G, and B data of the compressed second pixel data.

Namely, in an embodiment, since the lowest bits of the R, G, and B data of the compressed first pixel data are 0, 0, and 0, respectively, and the lowest bits of the R, G, and B data of the compressed second pixel data are 1, 0, and 1, respectively, the R, G, and B data of the first pixel data may be restored to the binary 110000, 110000, and 110000, respectively, and the R, G, and B data of the second pixel data may be restored to the binary 101111, 101100, and 001111, respectively.

Figure 6:
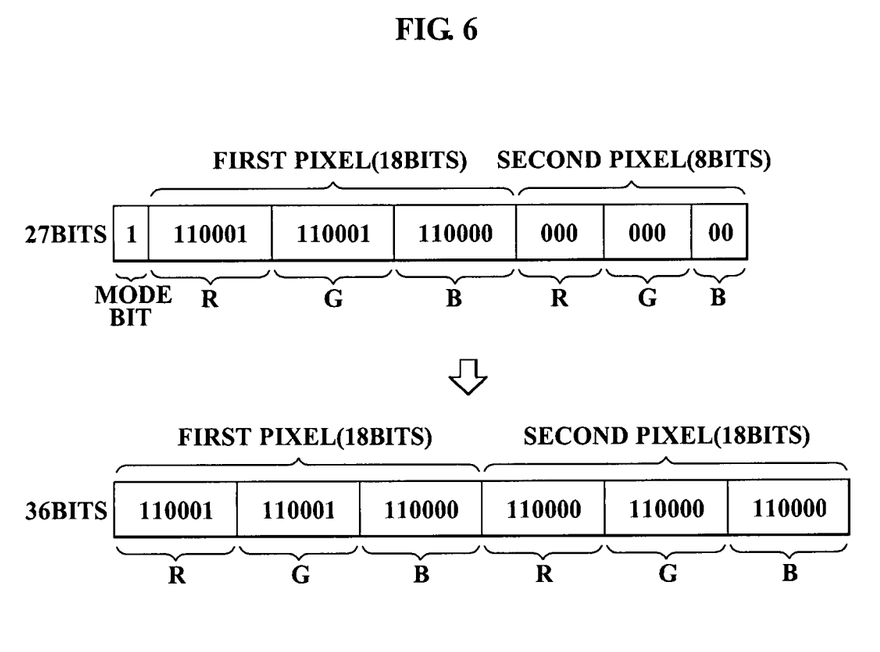
FIG. 6 illustrates a method of decompressing pixel data, such as compressed by the first compression mode, according to an embodiment of the present invention.

FIG. 6 illustrates a method of restoring pixel data, e.g., as compressed by the first compression mode, according to an embodiment of the present invention.

Referring to FIG. 6, in an embodiment, the mode bit for the pixel data may be 1, R, G, and B data of first pixel data may be represented by the binary 110001, 110001, and 110000, respectively, and R, G, and B data of second pixel data may be represented by the compressed 000, 000, and 00, respectively. Here, in this example, together the compressed pixel data is made up of 27 bit data.

When restoring the two pixel data having the total of 27 bits, as shown in FIG. 6, the two pixel data may be decoded to 36 bit data as further shown in FIG. 6.

Since the mode bit of the compressed pixel data is 1, it may be determined that the corresponding pixel data has been compressed according to the first compression mode.

With respect to the first pixel data, the R, G, and B data may be restored, without change, i.e., as they are. Thus, the R, G, and B data of the first pixel data can be encoded and decoded as they are without data loss.

With respect to the R and G data of the second pixel data, the three high-order bits of the R and G data of the first pixel data can be established for the three high-order bits of the R and G data of the second pixel data.

Since, the R and G data of the compressed second pixel data are represented by 000 and 000, respectively, and the three high-order bits of the R and G data of the pixel data are 110 and 110, respectively, the R and G data of the second pixel data area can be restored to the binary 110000 and 110000, respectively.

Further, since the B data of the compressed second pixel is represented by 00 and a fourth bit and a fifth bit of the B data of the first pixel data are 00, with respect to the B data of the compressed second pixel data, three high-order bits can be restored to 110, the same as the three high-order bits of the B data of the first pixel data, and the lowest bit can be restored to 0, the same as the lowest bit of the B data of the first pixel data. Accordingly, in this example, the B data for the second pixel data can be restored to the binary 110000.

Figure 7:
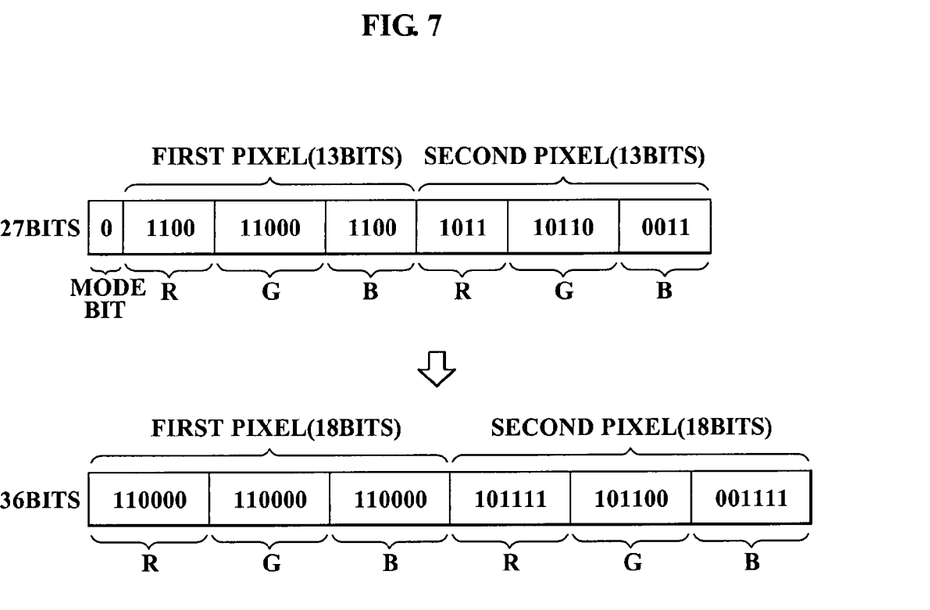
FIG. 7 illustrates a method of decompressing pixel data, such as compressed by the second compression mode, according to an embodiment of the present invention.

FIG. 7 illustrates a method of restoring pixel data, e.g., as compressed by the second compression mode, according to an embodiment of the present invention.

Referring to FIG. 7, the mode bit of the compressed pixel data may be 0, the R, G, and B data of first pixel data may have been compressed to 1100, 11000, and 1100, respectively, and the R, G, and B data of second pixel data have been compressed to 1011, 10110, and 0011, respectively. Again, in this example, a total of 27 bits of data represent the compressed pixel data.

When restoring the two pixel data of for the total 27 bits shown in FIG. 7, the two pixel data are restored into a total of 36 bit data, as further shown in FIG. 7.

Since the mode bit of the compressed pixel data is 0, it may be determined that the corresponding pixel data has been compressed according to the second compression mode.

With respect to the first pixel data, since the R, G, and B data of the compressed first pixel are represented by 1100, 11000, and 1100, respectively, the R, G, and B data may be restored to the binary 110000, 110000, and 110000 by duplicating the lowest bits 0, 0, and 0.

Further, with respect to the second pixel data, since the R, G, and B data of the compressed second pixel data are represented by 1011, 10110, and 0011, the R, G, and B data of the second pixel data may be restored to the binary 101111, 101100, and 001111 by duplicating the lowest bits 1, 0, and 1, for example.

Figure 8:
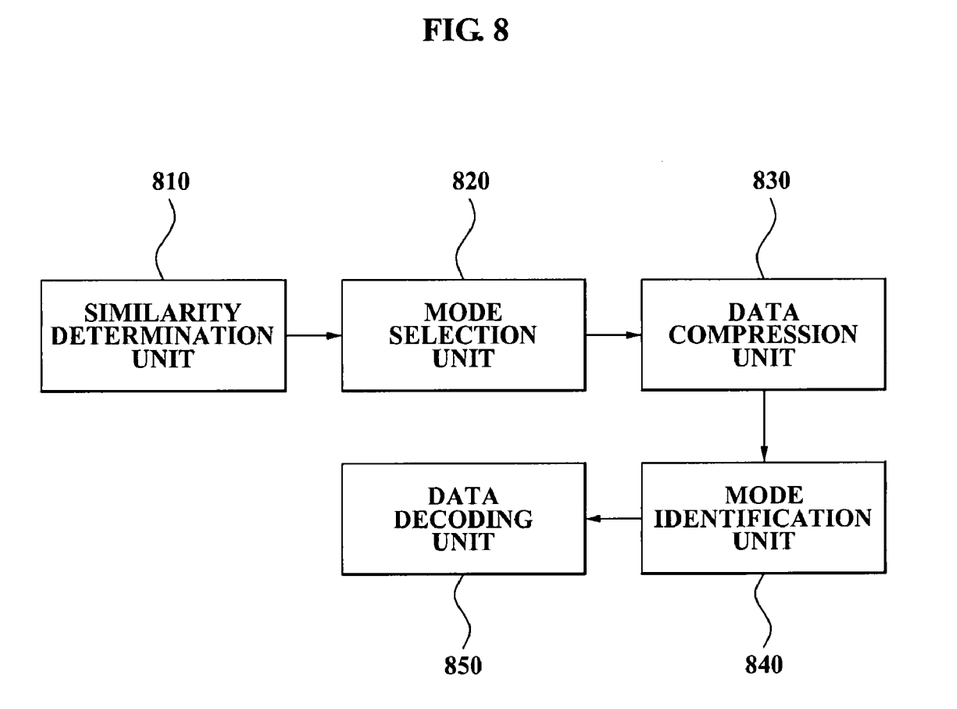
FIG. 8 illustrates a pixel data compression/decompression system, according to an embodiment of the present invention.

FIG. 8 illustrates a pixel data compression and/or decompression system, according to an embodiment of the present invention.

Referring to FIG. 8, the pixel data compression system may include a similarity determination unit 810, a mode selection unit 820, and a data compression unit 830, for example.

Depending on embodiments, the pixel data compression system may further include a mode identification unit 840 and a data decoding unit 850, for example.

The similarity determination unit 810 may determine the similarity between first pixel data and second pixel data, e.g., adjacent to the first pixel data. Depending on embodiment, the similarity between the two pixel data may be separately determined for each of the respective R, G, and B data.

In one embodiment, when predetermined high-order bits of each of the R, G, and B data of the first pixel data are identical with high-order bits of each of the R, G, and B data of the second pixel data, or a difference between a respective decimal value of each of the R, G, and B data of the first pixel data and the R, G, and B data of the second pixel data is less than 1, the similarity determination unit 810 may determine the similarity to be high, i.e., that a similarity exists. When the predetermined high-order bits of each of the R, G, and B data of the first pixel data are different from the high-order bits of each of the R, G, and B data of the second pixel data or the difference between the respective decimal value of the each of the R, G, and B data of the first pixel data and the R, G, and B data of the second pixel data is greater than 1, the similarity may be determined to be low or the similarity does not exist.

Based on the similarity, the mode selection unit 820 may select any one of a first compression mode, in which a difference between a compression ratio of the first pixel data and a compression ratio of the second pixel data is significant, and a second compression mode, in which the difference between the compression ratio of the first pixel data and the compression ratio of the second pixel data is low, i.e., in the first compression mode the resultant compressed data for the first and second pixel data may be significantly differently compressed, while in the second compression mode where the resultant compressed data for the first and second pixel data is more similarly compressed. In an embodiment, such a first and second compression modes may still result in a same length compressed data stream, i.e., they may have the same number of bits for the overall compression of the corresponding two pixel data.

Thus, when a similarity is high or found to exist, the mode selection unit 820 may determine whether errors occur when compressing the first pixel data and the second pixel data by the first compression mode is greater than an error occurring when compressing the first pixel data and the second pixel data by the second compression mode. When errors corresponding to the first compression mode are determined to be greater than errors corresponding to the second compression mode, the second compression mode may be selected for compressing the first and second pixel data. When errors corresponding to the first compression mode are determined to be less than errors corresponding to the second compression mode, the first compression mode may be selected for the compressing of the first and second pixel data.

Thus, in an embodiment, the mode selection unit may select the second compression mode when a similarity is low or found not to exist.

In this regard, the data compression unit 830 may, thus, selectively compress the first pixel data and the second pixel data by any one selected from the first compression mode and the second compression mode, for example, noting that alternative embodiments are equally available.

In an embodiment, the mode identification unit 840 may identify whether compressed pixel data has been compressed by the first compression mode or the second compression mode, for example, by using a mode bit.

When the compression of the pixel data is determined to correspond to the first compression mode, the data decoding unit 850 may decode the compressed first pixel data and second pixel data by establishing high-order bits of the compressed first pixel data to correspond to high-order bits of the compressed second pixel data. When the pixel data is determined to be compressed by the second compression mode, the data decoding unit 850, for example, may alternatively decode the compressed first pixel data and second pixel data by duplicating the lowest bits of the compressed first pixel data and the compressed second pixel data. Here, again, it is noted that alternative embodiments are equally available.

An aspect of an embodiment of the present invention includes a pixel data compression method, medium, and system, where the similarity between two adjacent pixels may be efficiently calculated and a suitable compression mode selected, thereby minimizing deterioration of definition while compressing pixel data.

An aspect of an embodiment of the present invention further includes a pixel data compression method, medium, and system capable of reducing complexity, and efficiently compressing pixel data.

An aspect of an embodiment of the present invention still further includes a pixel data compression method, medium, and system capable of efficiently identifying a desired part of a total screen of a display device to encode/decode according to an efficient compression algorithm.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pixel data compression method, comprising:
identifying whether a similarity exists between a first pixel data and a second pixel data, with a pixel represented by the second pixel data being adjacent to a pixel represented by the first pixel data;
selecting a compression mode from one of a first compression mode and a second compression mode based upon whether the similarity is determined to exist, with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference; and
compressing the first pixel data and the second pixel data using the selected compression mode.

2. The method of claim 1, wherein the identifying of whether the similarity exists comprises:
determining the similarity to exist when predetermined high-order bits of each of respective R, G, and B information with respect to the first pixel data and the second pixel data are identical, or a difference of a decimal value of the each of R, G, and B information with respect to the first pixel data and the second pixel data is 1; and
determining the similarity to not exist when the predetermined respective high-order bits of the each of R, G, and B information with respect to the first pixel data and the second pixel data is different, and the difference of the decimal value of the each of R, G, and B information with respect to the first pixel data and the second pixel data is greater than 1.

3. The method of claim 2, wherein the selecting of the compression mode comprises:
determining whether an error amount occurring during a preliminary compressing of the first pixel data and the second pixel data by the first compression mode is greater than an error amount occurring during a preliminary compressing of the first pixel data and the second pixel data by the second compression mode, when the similarity is determined to exist based upon a result of the determining of the similarity to exist;
selecting the second compression mode as the compression mode when the error amount corresponding to the preliminary compressing of the first pixel data and the second pixel data by the first compression mode is greater than the error amount corresponding to the preliminary compressing of the first pixel data and the second pixel data by the second compression mode; and
selecting the first compression mode as the compression mode when the error amount corresponding to the preliminary compressing of the first pixel data and the second pixel data by the first compression mode is less than the error amount corresponding to the preliminary compressing of the first pixel data and the second pixel data by the second compression mode.

4. The method of claim 3, wherein the selecting of the compression mode comprises selecting the second compression mode as the compression mode when the similarity is determined not to exist.

5. The method of claim 2, further comprising:
determining which one of the first compression mode and the second compression mode the compressed first and second pixel data is compressed by, based on a mode bit coexistent with the compressed first and second pixel data;
decoding the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode; and
decoding the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

6. The method of claim 5, wherein the first compression mode encodes the each of the R, G, and B data of the first pixel data into six bits, six bits, and six bits, respectively, without change, encodes the R and G data of the second pixel data into three bits and three bits, respectively, which are of lower order bits of respective corresponding six bits, and encodes the B data of the second pixel data into two bits which are high-order bits from three low-order bits of corresponding six bits.

7. The method of claim 6, wherein the decoding of the compressed first and second pixel data, by using observed high-order bits of the corresponding R, G, and B data of the compressed first pixel data for the high-order bits of the corresponding R, G, and B of the compressed second pixel data when it is determined that the compressed first and second pixel data are compressed according to the first compression mode, comprises:
establishing three high-order bits with respect to each of the corresponding R, G, and B data of the compressed second pixel data to be same as the three high-order bits of each of the respective corresponding R, G, and B data of the first pixel data;
restoring a lowest bit of the B data of the compressed first pixel data as a lowest bit corresponding to the B data of the compressed second pixel data when a high-order fourth bit and fifth bit of the B data of the compressed first pixel data is identical to a high-order fourth bit and fifth bit of the B data of the compressed second pixel data;
restoring the lowest bit corresponding to the B data of the second pixel data to a 0 when the high-order fourth bit and fifth bit of the B data of the compressed second pixel data is greater than the high-order fourth bit and fifth bit of the B data of the compressed first pixel data; and
restoring the lowest bit corresponding to the B data of the second pixel data to a 1 when the high-order fourth bit and fifth bit of the B data of the compressed second pixel data is less than the high-order fourth bit and fifth bit of the B data of the compressed first pixel data.

8. The method of claim 5, wherein the second compression mode encodes each of the R, G, and B of both of the first pixel data and the second pixel data by high-order four bits, five bits, and four bits from original six bits, six bits, and six bits, respectively.

9. The method of claim 8, wherein the decoding of the compressed first and second pixel data, by repeating the observed lowest order bits of the corresponding R, G, and B data of the compressed first pixel data for decoding the compressed first pixel data and by repeating the observed lowest order bits of the corresponding R, G, and B data of the compressed second pixel data for the decoding of the compressed second pixel data, comprises assigning a value identical with a lowest bit of each of the R, G, and B of the compressed first pixel data to low-order two bits, one bits, and two bits, respectively, for the each of the R, G, and B for decoding both of the compressed first and second pixel data.

10. At least one non-transitory computer-readable storage medium comprising computer readable code to control at least one processing element to implement the method of claim 1.

11. A pixel data decompression method, comprising:
determining which one of a first compression mode and a second compression mode a compressed first and second pixel data is compressed by, based on a mode bit coexistent with the compressed first and second pixel data;
decoding the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode; and
decoding the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

12. The method of claim 11, wherein the first compression mode encodes each of the R, G, and B data of the first pixel data into six bits, six bits, and six bits, respectively, without change, encodes the R and G data of the second pixel data into three bits and three bits, respectively, which are of lower order bits of respective corresponding six bits, and encodes the B data of the second pixel data into two bits which are high-order bits from three low-order bits of corresponding six bits.

13. The method of claim 12, wherein the decoding of the compressed first and second pixel data, by using observed high-order bits of the corresponding R, G, and B data of the compressed first pixel data for the high-order bits of the corresponding R, G, and B of the compressed second pixel data when it is determined that the compressed first and second pixel data are compressed according to the first compression mode, comprises:
establishing three high-order bits with respect to each of the corresponding R, G, and B data of the compressed second pixel data to be same as the three high-order bits of each of the respective corresponding R, G, and B data of the first pixel data;
restoring a lowest bit of the B data of the compressed first pixel data as a lowest bit corresponding to the B data of the compressed second pixel data when a high-order fourth bit and fifth bit of the B data of the compressed first pixel data is identical to a high-order fourth bit and fifth bit of the B data of the compressed second pixel data;
restoring the lowest bit corresponding to the B data of the second pixel data to a 0 when the high-order fourth bit and fifth bit of the B data of the compressed second pixel data is greater than the high-order fourth bit and fifth bit of the B data of the compressed first pixel data; and
restoring the lowest bit corresponding to the B data of the second pixel data to a 1 when the high-order fourth bit and fifth bit of the B data of the compressed second pixel data is less than the high-order fourth bit and fifth bit of the B data of the compressed first pixel data.

14. The method of claim 11, wherein the second compression mode encodes each of the R, G, and B of both of the first pixel data and the second pixel data by high-order four bits, five bits, and four bits from original six bits, six bits, and six bits, respectively.

15. The method of claim 14, wherein the decoding of the compressed first and second pixel data, by repeating the observed lowest order bits of the corresponding R, G, and B data of the compressed first pixel data for decoding the compressed first pixel data and by repeating the observed lowest order bits of the corresponding R, G, and B data of the compressed second pixel data for the decoding of the compressed second pixel data, comprises assigning a value identical with a lowest bit of each of the R, G, and B of the compressed first pixel data to low-order two bits, one bits, and two bits, respectively, for the each of the R, G, and B for decoding both of the compressed first and second pixel data.

16. At least one non-transitory computer-readable storage medium comprising computer readable code to control at least one processing element to implement the method of claim 11.

17. A method for compressing video data, comprising:
selectively, within a video image bitstream, compressing separate components of a first pixel of the video data and separate components of a sequential second pixel of the video data according to a selected one of one of a first compression mode and a second compression mode with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference,
wherein both the first compression mode and the second compression mode compress separate components of pixels to generate compressed pixel data with same bit lengths.

18. The method of claim 17, wherein the selection of the one of the first compression mode and the second compression mode is based upon a similarity existence determination between the first pixel and the second pixel.

19. The method of claim 18, wherein the selection of the one of the first compression mode and the second compression mode is further based upon a comparison of compression errors for the first compression mode and the second compression mode during preliminarily compressions of corresponding first and second pixel data.

20. The method of claim 17, wherein the selection of the one of the first compression mode and the second compression mode is further based upon a comparison of compression errors for the first compression mode and the second compression mode during preliminarily compressions of corresponding first and second pixel data.

21. At least one non-transitory computer-readable medium comprising computer readable code to control at least one processing element to implement the method of claim 17.

22. A method for decompressing video data, comprising:
  determining which one of a first compression mode and a second compression mode a compressed first and second pixel data is compressed by, based on a mode bit coexistent with the compressed first and second pixel data;
  selectively, within a corresponding video image bitstream, decompressing separate components of a first pixel of the video data, corresponding to the first pixel data, and separate components of a sequential second pixel of the video data, corresponding to the second pixel data, according to a selected one of the one of the first compression mode and a second compression mode with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference,
  wherein both the first compression mode and the second compression mode compress separate components of pixels to generate compressed pixel data with same bit lengths.

23. At least one non-transitory computer-readable storage medium comprising computer readable code to control at least one processing element to implement the method of claim 22.

24. A pixel data compression system, comprising:
  a similarity determination unit to identify whether a similarity exists between a first pixel data and a second pixel data, with a pixel represented by the second pixel data being adjacent to a pixel represented by the first pixel data;
  a mode selection unit to select a compression mode from one of a first compression mode and a second compression mode based upon whether the similarity is determined to exist, with the first compression mode having a first difference between a first compression ratio for the first pixel data and a first compression ratio for the second pixel data and the second compression mode having a second difference between a second compression ratio for the first pixel data and a second compression ratio for the second pixel data, such that the first difference is greater than the second difference; and
  a data compression unit to compress the first pixel data and the second pixel data using the selected compression mode and store the data in a memory.

25. The system of claim 24, wherein the identifying of whether the similarity exists comprises performing operations of:
  determining the similarity to exist when predetermined high-order bits of each of respective R, G, and B information with respect to the first pixel data and the second pixel data are identical, or a difference of a decimal value of the each of R, G, and B information with respect to the first pixel data and the second pixel data is 1; and
  determining the similarity to not exist when the predetermined respective high-order bits of the each of R, G, and B information with respect to the first pixel data and the second pixel data is different, and the difference of the decimal value of the each of R, G, and B information with respect to the first pixel data and the second pixel data is greater than 1.

26. The system of claim 25, wherein the mode selection unit performs operations of:
  determining whether an error amount occurring during a preliminary compressing of the first pixel data and the second pixel data by the first compression mode is greater than an error amount occurring during a preliminary compressing of the first pixel data and the second pixel data by the second compression mode, when the similarity is determined to exist based upon a result of the determining of the similarity to exist;
  selecting the second compression mode as the compression mode when the error amount corresponding to the preliminary compressing of the first pixel data and the second pixel data by the first compression mode is greater than the error amount corresponding to the preliminary compressing of the first pixel data and the second pixel data by the second compression mode; and
  selecting the first compression mode as the compression mode when the error amount corresponding to the preliminary compressing of the first pixel data and the second pixel data by the first compression mode is less than the error amount corresponding to the preliminary compressing of the first pixel data and the second pixel data by the second compression mode.

27. The system of claim 26, wherein the mode selection unit selects the second compression mode as the compression mode when the similarity is determined not to exist.

28. The system of claim 25, further comprising:
  a mode identification unit to determine which one of the first compression mode and the second compression mode the compressed first and second pixel data is compressed by, based on a mode bit coexistent with the compressed first and second pixel data; and
  a data decoding unit to decode the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode, and to decode the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

29. The system of claim 28, wherein the first compression mode encodes the each of the R, G, and B data of the first pixel data into six bits, six bits, and six bits, respectively, without change, encodes the R and G data of the second pixel data into three bits and three bits, respectively, which are of lower order bits of respective corresponding six bits, and encodes the B data of the second pixel data into two bits which are high-order bits from three low-order bits of corresponding six bits.

30. The system of claim 29, wherein, when it is determined by the mode identification unit that the first pixel data and second pixel data are compressed by the first compression mode, the data decoding unit performs the operations of:
  establishing three high-order bits with respect to each of the corresponding R, G, and B data of the compressed second pixel data to be same as the three high-order bits of each of the respective corresponding R, G, and B data of the first pixel data;

restoring a lowest bit of the B data of the compressed first pixel data as a lowest bit corresponding to the B data of the compressed second pixel data when a high-order fourth bit and fifth bit of the B data of the compressed first pixel data is identical to a high-order fourth bit and fifth bit of the B data of the compressed second pixel data;

restoring the lowest bit corresponding to the B data of the second pixel data to a 0 when the high-order fourth bit and fifth bit of the B data of the compressed second pixel data is greater than the high-order fourth bit and fifth bit of the B data of the compressed first pixel data; and restoring the lowest bit corresponding to the B data of the second pixel data to a 1 when the high-order fourth bit and fifth bit of the B data of the compressed second pixel data is less than the high-order fourth bit and fifth bit of the B data of the compressed first pixel data.

31. The system of claim 28, wherein the second compression mode encodes each of the R, G, and B of both the first pixel data and the second pixel data by high-order four bits, five bits, and four bits from original six bits, six bits, and six bits, respectively.

32. The system of claim 31, wherein, when it is determined by the mode identification unit that the first pixel data and the second pixel data are compressed by the second compression mode, the data decoding unit assigns a value identical with a lowest bit of each of the R, G, and B of the compressed first pixel data to low-order two bits, one bits, and two bits, respectively, for the each of the R, G, and B for decoding both of the compressed first and second pixel data.

33. A pixel data decompression system, comprising:
a mode identification unit to identify which one of a first compression mode and a second compression mode a compressed first and second pixel data stored in a memory is compressed by, based on a mode bit coexistent with the compressed first and second pixel data; and a data decoding unit to decode the compressed first and second pixel data by using observed high-order bits of corresponding R, G, and B data of the compressed first pixel data for high-order bits of corresponding R, G, and B of the compressed second pixel data when it is determined that the compressed first and second pixel data are compressed according to the first compression mode, and to decode the compressed first and second pixel data by repeating observed lowest order bits of corresponding R, G, and B data of the compressed first pixel data for decoding the compressed first pixel data and by repeating observed lowest order bits of corresponding R, G, and B data of the compressed second pixel data for decoding the compressed second pixel data, when it is determined that the compressed first and second pixel data are compressed according to the second compression mode.

34. The system of claim 33, wherein the first compression mode encodes each of the R, G, and B data of the first pixel data into six bits, six bits, and six bits, respectively, without change, encodes the R and G data of the second pixel data into three bits and three bits, respectively, which are of lower order bits of respective corresponding six bits, and encodes the B data of the second pixel data into two bits which are high-order bits from three low-order bits of corresponding six bits.

35. The system of claim 34, wherein, when it is determined by the mode identification unit that the first pixel data and second pixel data are compressed by the first compression mode, the data decoding unit performs the operations of:
establishing three high-order bits with respect to each of the corresponding R, G, and B data of the compressed second pixel data to be same as the three high-order bits of each of the respective corresponding R, G, and B data of the first pixel data;

restoring a lowest bit of the B data of the compressed first pixel data as a lowest bit corresponding to the B data of the compressed second pixel data when a high-order fourth bit and fifth bit of the B data of the compressed first pixel data is identical to a high-order fourth bit and fifth bit of the B data of the compressed second pixel data;

restoring the lowest bit corresponding to the B data of the second pixel data to a 0 when the high-order fourth bit and fifth bit of the B data of the compressed second pixel data is greater than the high-order fourth bit and fifth bit of the B data of the compressed first pixel data; and restoring the lowest bit corresponding to the B data of the second pixel data to a 1 when the high-order fourth bit and fifth bit of the B data of the compressed second pixel data is less than the high-order fourth bit and fifth bit of the B data of the compressed first pixel data.

36. The system of claim 33, wherein the second compression mode encodes each of the R, G, and B of both of the first pixel data and the second pixel data by high-order four bits, five bits, and four bits from original six bits, six bits, and six bits, respectively.

37. The system of claim 36, wherein, when it is determined by the mode identification unit that the first pixel data and the second pixel data are compressed by the second compression mode, the data decoding unit assigns a value identical with a lowest bit of each of the R, G, and B of the compressed first pixel data to low-order two bits, one bits, and two bits, respectively, for the each of the R, G, and B for decoding both of the compressed first and second pixel data.

* * * * *

UNITED STATES PATENT AND TRADEMARK OFFICE
CERTIFICATE OF CORRECTION

| | |
|---|---|
| PATENT NO. | : 7,983,494 B2 |
| APPLICATION NO. | : 11/711637 |
| DATED | : July 19, 2011 |
| INVENTOR(S) | : Shi Hwa Lee et al. |

It is certified that error appears in the above-identified patent and that said Letters Patent is hereby corrected as shown below:

Column 16, Line 35 (Approx.), In Claim 17, delete "one of one of" and insert -- one of --, therefor.

Column 17, Line 13 (Approx.), In Claim 22, delete "one of the one of the" and insert -- one of the --, therefor.

Signed and Sealed this
Fourteenth Day of February, 2012

David J. Kappos
*Director of the United States Patent and Trademark Office*